June 20, 1939.　　　E. W. CHAFEE ET AL　　　2,162,699
BOMB SIGHT
Original Filed Feb. 20, 1936　　3 Sheets-Sheet 3
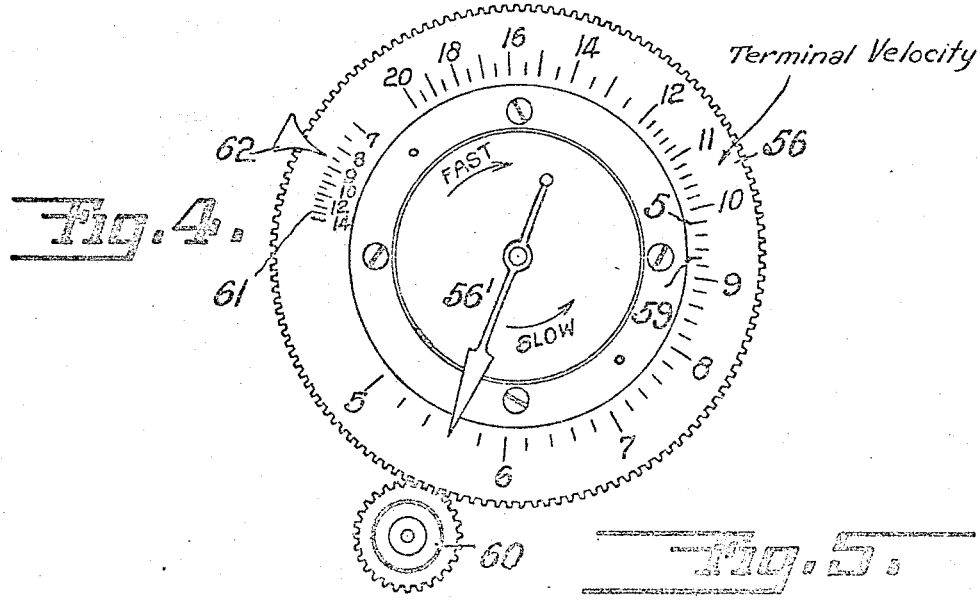
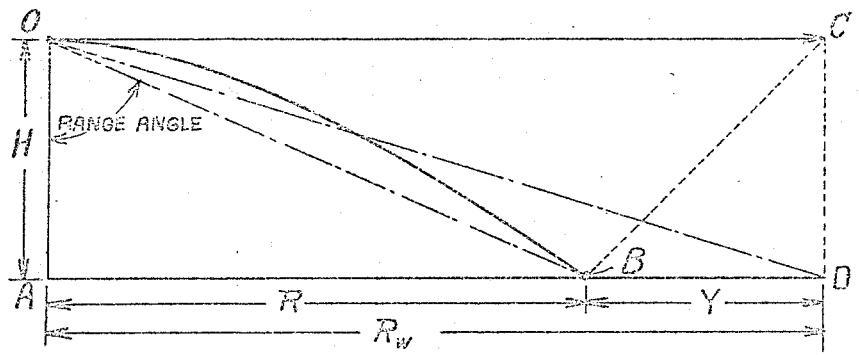
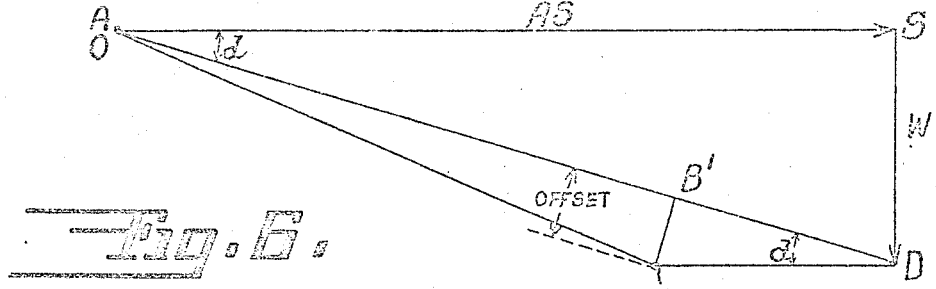
INVENTORS
EARL W. CHAFEE
HOWARD C. VAN AUKEN
BY
Herbert H. Thompson
THEIR ATTORNEY.

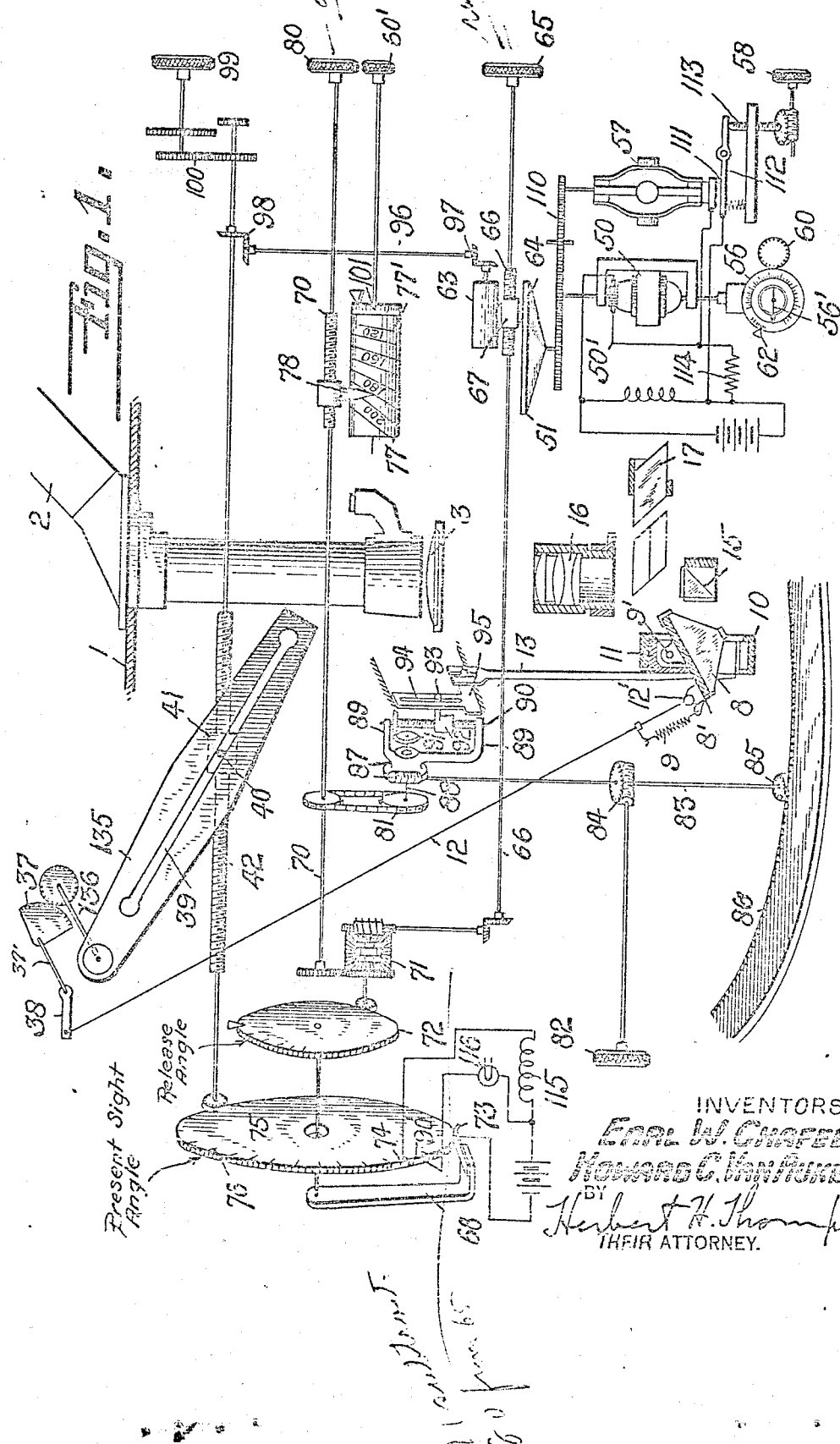

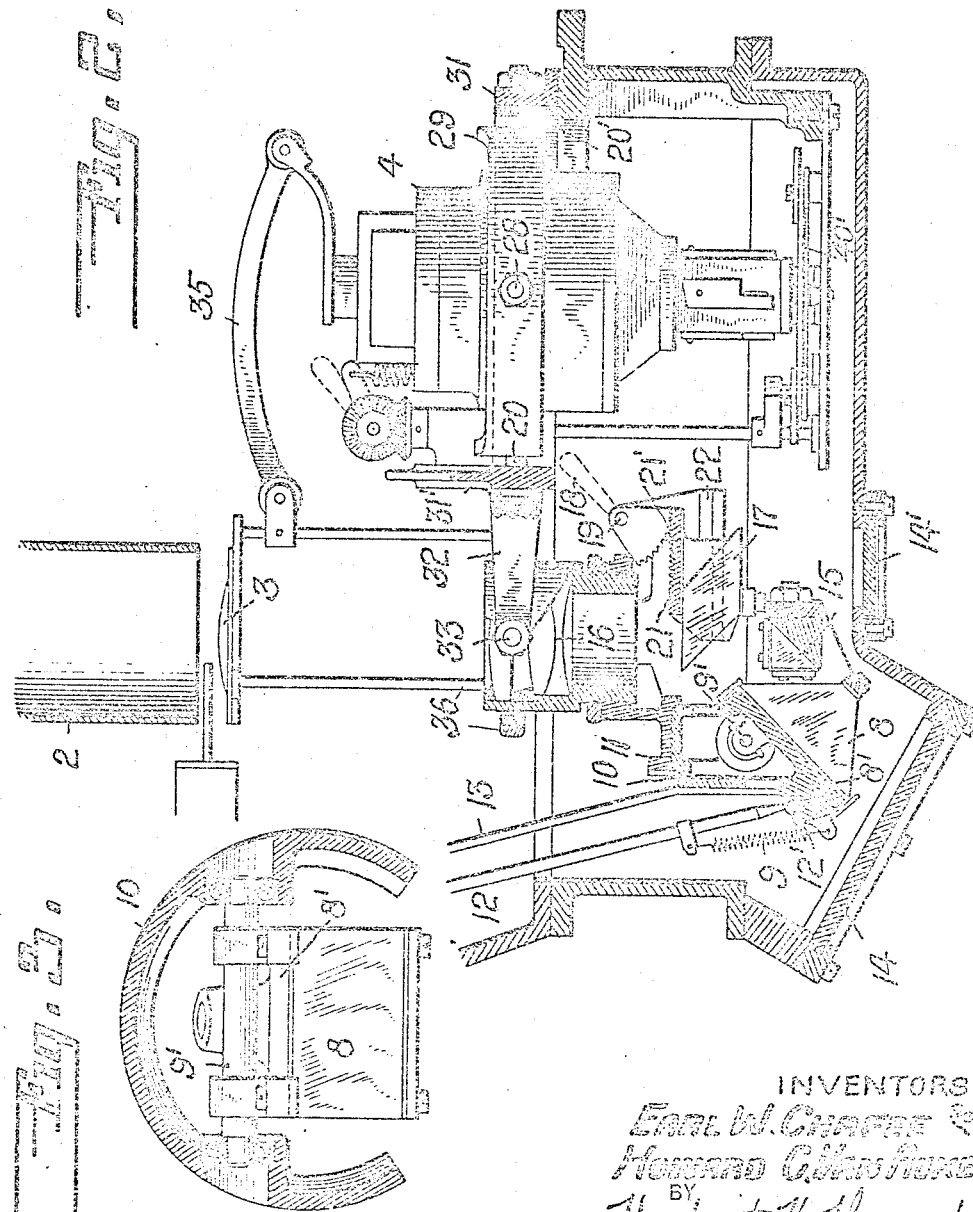

Patented June 20, 1939

2,162,699

UNITED STATES PATENT OFFICE 2,162,699

BOMB SIGHT

Earl W. Chafee, New York, N. Y., and Howard C. Van Auken, Bloomfield, N. J., assignors to Sperry Gyroscope Company, Inc., Brooklyn, N. Y., a corporation of New York Application February 20, 1936, Serial No. 64,840
Renewed March 11, 1939

12 Claims. (Cl. 33—46.5)

This invention relates to bomb sights for aircraft which are designed to direct the course of the aircraft so that its ground track (neglecting offset) passes through the target in a straight line and which determine the exact point at which the bombs shall be released to strike the target. More specifically, this invention constitutes an improvement or simplification of the type of bomb sight disclosed in the prior joint application of Earl W. Chafee, one of the joint inventors herein, and Hugh Murtagh, Serial No. 618,030, filed June 18, 1932. By the present invention, the number of hand settings in the sight is reduced and the computing mechanism simplified.

Referring to the drawings showing one form our invention may assume,

Fig. 1 is a diagram of the computing portion of the sight, showing the sight itself diagrammatically.

Fig. 2 is a side view, partly in section, of a portion of the sight, showing the gyro vertical and the optical system.

Fig. 3 is a detailed sectional view of the mounting for the line of sight prism.

Fig. 4 is a plan view of the altitude indicator driven by the variable speed motor.

Fig. 5 is an elevation diagram showing the theory of operation of the sight.

Fig. 6 is a plan view of the vectors involved in cross wind bombing.

Bomb sights may be considered as made up of several units, namely, the optical unit and the computing unit, all contained within the common casing 1. The optical system comprises, in general, a telescope 2 rotatably mounted in the top of casing 1 which, through an optical system (not shown in its entirety) views an image of the ground appearing on a stabilized reticule 3. Said reticule is preferably the only part of the optical system connected to the stabilizing gyroscope or gyro vertical 4, and is provided with cross hairs (not shown) placed fore and aft and transversely with respect to the aircraft. The ground image is thrown upon the reticule from a prism or other reflector 8, which is preferably pivoted about a transverse axis 8' so that the line of sight may be kept upon the target on the ground as the aircraft approaches and flies over the same, the prism rotating, of course, at half the angular rate of the line of sight. Said prism is also preferably mounted for turning about a fore and aft axis on the craft so that the proper offset angle may be set up, after the manner disclosed in the prior patent to Mortimer F. Bates, No. 1,783,769, dated December 2, 1930, on Bomb sight.

As shown, the pivotal transverse shaft 8', on which the mirror is mounted, is journaled in a ring 10 which, in turn, is mounted for angular adjustment in an outer fixed guide 11. The adjustment of the prism about the transverse axis to follow the target is shown as effected through a rod 12 having a swivel connection 12' with the back frame 8' of the prism, the ball and socket being held together by spring 9. The adjustment about the longitudinal axis for the offset angle or deflection is shown as effected through an arm 13 secured to the back of ring 10. The line of sight from the ground enters through the window 14 (Fig. 2) and is reflected by the prism 8 to a second fixed prism 15 which directs the image along a vertical line through the objective lenses 16 which focus the image on the stabilized reticule 3.

Preferably, we incorporate in the sight a means for quickly and accurately determining the correct drift angle. For this purpose we have shown an auxiliary drift prism 17 or other double reflector slidably mounted between the prism 15 and the lenses 16. Said drift prism is normally pushed out of this line of sight by means of the handle 18, pivoted at 19 and having segmental teeth 21' thereon meshing with rack teeth 21 on the framework carrying the prism, which is slidably mounted on trackway 22. When it is desired to ascertain the drift, however, the handle 18 is moved to the position shown in dotted lines in Fig. 2, pushing the prism 17 to the left into the full line position, whereby, by double reflection, the image of the ground lying vertically below the craft, as seen through the window 14', is reflected up through the lenses 16 to the reticule. The bomber, in looking through the telescope, then sees objects on the ground passing across the optical field. As the motion of these objects in relation to the reticule is caused only by the forward motion of the plane over the earth, the roll and pitch of the plane being taken out by the stabilized reticule, the direction of motion across the field is parallel to the ground course the plane is flying. Therefore, if the sight as a whole is turned until the objects in the field of view move along or parallel to the fore and aft hair on the reticule, then the sight will be pointed in the direction of the ground course or, in other words, the correct drift angle for that particular course will be set into the bomb sight. After obtaining the correct drift angle, the prism 17 is moved out of the way by moving handle 18 to the left in Fig. 2. In actual operation, the bomber may keep prism 17 at an intermediate position where it intercepts only a part of the field of view. In such case, by shifting his eye from the forward to the rearward line of sight through the telescope, he may see either the distant target or the ground beneath the plane at will or almost simultaneously.

The apparent ground speed is set up through handle 65, by which an automatic means is set into motion which causes the prism to remain on the target as the craft flies toward it, as hereinafter described.

As stated, the reticle is stabilized from a gyro vertical (Fig. 2) which is shown as a universally mounted gyroscope having the top thereof connected by linkage 35 to a gimbaled framework 36 so that the reticle 3 is stabilized in both planes, which, in effect, stabilizes the optical system. The gyroscope 4 is shown as mounted for oscillation about a transverse axis 28 in an outer gimbal ring 29 which, in turn, is mounted for oscillation about a fore and aft axis on trunnions 20—20' in fixed frame 31. Said gimbal is provided with forwardly extending arms 32 which support the frame 36 on transverse axis 33, so that a common gimbal is provided for both the gyroscope and reticle frame. The gyroscope is preferably locked until the sight is thrown into operation, by means of locking or caging fingers 49' pivoted around the base thereof, all as more fully disclosed in the aforesaid prior application.

Referring now to the computing mechanism, the prism 6 is rotated about axis 9', to keep the target in view, by means of a bar 135 shown as mounted on a shaft 136 and driving the prism 6 through gearing 37, shaft 37', arm 38 and the aforesaid link 12. If the prism is turned at such a rate as to keep the line of sight on the target, this rate may be used as one of the known factors in solving for the desired point of release of the bomb, sometimes termed the range angle. Preferably the angular movement of the arm 135 is resolved into a horizontal component representing ground speed (GS). To this end, the bar is shown as provided with a slot 39 into which projects a pin 40 on a nut 41 threaded on screw shaft 42. The rate of turn of said screw shaft, therefore, is a function of the ground speed, but is also an inverse function of altitude since the speed of angular movement of the prism will decrease with increased altitude. If the mechanism is laid out for one particular altitude, say 5000 feet, the introduction of any other altitude could be compensated for by multiplying by the ratio of the chosen altitude H to the actual altitude H', the ratio $$\frac{H}{H'}$$

being known as the altitude ratio. Having the speed of shaft 42 proportional to ground speed and the altitude ratio, we combine the same with the time of fall of the bomb in order to obtain the whole range to the scale of the instrument, i. e., having regard to the altitude ratio, which range we term herein $R_{wa}$. Since the whole range ($R_w$) is equal to the time of fall of the bomb (T) times the ground speed (GS), i. e., $$R_w = T \times GS$$

it follows that $R_{wa}$ (whole range to scale of the instrument) =

$$T \times GS \times \left(\frac{H}{H'}\right)$$

which may also be written $$R_{wa} = \frac{GS\left(\frac{H}{H'}\right)}{\frac{1}{T}}$$

The time of fall of the bomb (T), however, varies with altitude H' and with the terminal velocity $T_v$ of the particular bomb employed, both of which quantities H' and $T_v$ are known. We therefore provide a mechanical integrator to solve the above equation from the known factors. We drive a variable speed disc 51 at a speed representing $$\frac{1}{T}$$

or, in other words, inversely proportional to altitude and terminal velocity. This may be effected by driving the same from a variable speed motor 56 through suitable gearing, the speed of the motor being accurately controlled by any suitable form of speed governor 57 from a hand setting means 58. As shown, the fly ball governor is driven from the motor shaft through gearing 110 and makes and breaks a contact 111 on lever 112, the position of which is varied by rotating thumb piece 58 to turn screw 113. Said contact serves to cut a resistance 114 in and out of the armature circuit 56' to regulate the motor speed. The motor also drives a speedometer pointer 56' readable upon dial 59 which is graduated at 59 (see Fig. 4) inversely in altitude instead of R. P. M. The altitude dial, however, is adjustable in accordance with the terminal velocity of the bomb employed by means of a setting knob 60 which is turned to adjust the arbitrary scale 61 graduated in terminal velocity of the bomb with reference to a fixed index 62. The terminal velocity of the bomb is of course dependent upon the bomb's specific gravity, shape, etc., and is hence frequently referred to as the bomb characteristics. Therefore, by setting up first the proper terminal velocity for the type of bomb employed and then adjusting the variable speed knob until the speedometer pointer 56' indicates or matches the known altitude, the disc 51 will be driven at a speed proportional to $$\frac{1}{T}$$

The driven cylinder 63 of the variable speed gear must be driven at a speed proportional to the ground speed multiplied by the altitude ratio if the sight is kept on the target, so that the mechanism, in dividing this product by $$\frac{1}{T}$$

solves the above equation for $R_w$. Therefore the linear position of the ball or other type roller 64 from the center of the disc represents the total range or $R_w$. This is set in by turning the knob 65 on the threaded shaft 66 on which the nut 67 is threaded, which carries the ball 64, said knob operating as a ground speed synchronizing knob. Shaft 42 is shown as driven from cylinder 63 through cross shaft 96 and gearing 97 and 98. For hand setting, a knob 99 is shown, having a two speed gear connection 100 with shaft 42.

From the diagram in Fig. 5 it is apparent that the true range R is equal to the whole range $R_w$ minus trail Y. Therefore it is necessary to subtract the trail from the whole range in positioning the range arm 69. The trail value is introduced from the shaft 70 that is connected to one arm of a differential 71, the other arm being connected to and driven from the shaft 66. The resulting difference rotates a disc 72 on which a release angle scale may be inscribed, and also rotates the range angle bar or arm 69 carrying a release contact 73 cooperating with a release contact 74 on the continuously driven disc 75, which may be provided with a scale 76 showing the present sight angle. Said disc is shown as driven directly from the screw shaft 42 which, it will be remembered, is rotated proportionally to $$GS\left(\frac{H}{H'}\right)$$

Trail mechanism

If a bomb were dropped from an airplane in vacuo, it would remain directly under the plane. However, when dropped through air, the bomb is retarded by the air resistance so that to an observer in the plane it trails behind the airplane a distance BD, where D is ground projection of the airplane's position C at the instant of impact with the ground. This distance is termed the trail Y. For a given altitude, the trail is a function of air speed (AS) and the terminal velocity of the bomb ($T_v$).

$$Y = \frac{fAS}{fT_v}$$

According to our present invention, the trail as an angular quantity is obtained in a simple manner by employing a cylindrical scale 77 on which curves 77' marked in air speed are plotted with the circumferential distances proportional to the proper function of terminal velocity and the axial distances equal to trail, the curves being plotted from experimental data. The cylinder is rotated from the terminal velocity or bomb characteristics setting knob 60' on $T_v$ scale 101. Cooperating with curves 77' is a movable pointer 78, the hub of which is threaded on shaft 70, turned from the air speed setting knob 80. When the pointer is set on the proper air speed curve as shown on the scale, the shaft 70 is rotated to an angular distance representing trail, which is subtracted from the whole range, as explained above.

Offset mechanism

In case a cross wind is blowing, an additional factor must also be interposed (see Fig. 6). In this diagram the vector AS represents true air speed in magnitude and direction and the vector W the speed and direction of the wind. The ground speed of the craft would therefore be represented by the vector AD. If a bomb is released at O, however, it will not fall on the ground speed line, but will fall down wind to one side of the ground speed line, namely, at point B, the perpendicular distance BB' from B to OD being termed the offset. As shown in the above figure, the offset is equal to the trail Y multiplied by sin $d$, and it will also be seen that the angle $d$ is equal to the known drift angle. It is therefore necessary to determine the offset angle, in other words, the angle through which the prism 8 must be turned about the fore and aft axis within its mounting 11 so that the aircraft will fly to one side of the true ground course a distance equal to BB'. Such angle is a function of BB' and altitude $$\left(\tan a = \frac{H'}{BB'}\right)$$

and since H' is set into the machine as an operating ratio, the offset angle is a function of the offset.

The offset mechanism is shown as having the trail fed into the same from the shaft 70 through gearing 81 which turns shaft 86, and the drift angle is automatically set into the device from the turning of the sight around its vertical axis from the fore and aft line to a line which is parallel to the ground course, as previously described. This is represented as effected, in the diagram, through the azimuth control knob 82 which turns the shaft 83 through gearing 84. Said shaft is shown as having a pinion 85 meshing with a large internal gear 86 on the base of the sight, as more completely described in the prior application of Earl W. Chafee, one of the joint inventors herein, and Hugh Murtagh, Serial No. 618,080, filed June 18, 1932, for Bomb sight. Shaft 83 at the same time turns the bracket 87 about the axis of shaft 88. Said bracket rotatably supports, in two arms 89 thereof, a threaded shaft 90 which is rotated through bevel gears 91 from the shaft 88. A nut 92 is threaded on said shaft, which carries pin 93 engaging in a vertical slot 94 in a slide 95. Said slide will therefore be moved laterally a distance proportional to Y×sin $d$, representing the offset distance, which, as explained, is proportional to the offset since the altitude ratio affects the whole machine. The lateral movement of said slide 95 rocks the lever 13 to rotate the prism mounting 10 within the housing 11 so as to give the prism the proper offset angle to offset the line of sight the proper amount.

Operation

In brief, the operation of our invention is as follows. Before taking off, the proper terminal velocity or bomb characteristics settings may be put in by the knobs 60 and 60'. After the target is sighted, the drift angle is set up as explained, by turning the knob 82, and this automatically sets in the proper offset angle to the prism 8. As soon as a straight ground track from the target is arrived at, the complete mechanism is set in operation, the knob 58 being adjusted so that the pointer 55' reads the known altitude on the dial 59, the knob 65 being adjusted until the line of sight is maintained continuously on the target. The indicated air speed is set up by turning knob 80 to position pointer 78 on the scale 77. The mechanism will then automatically set the range bar 68 in the proper position to release the bomb by energizing solenoid 115 when the release disc 76, which is continuously rotated from the shaft 42, brings the release contact 74 under 73. If desired, an additional warning contact 96' may be provided to flash a signal 116 when the range angle is being approached.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a bomb sight, a variable speed device for maintaining the line of sight on the target, comprising a revoluble disc, a roller driven thereby, means for radially adjusting the roller on the disc, means for rotating the line of sight from said roller, and means for varying the speed of said disc inversely in accordance with altitude, whereby range is indicated directly by the radial position of said roller.

2. In a bomb sight for aircraft, a variable speed motor for rotating the line of sight to maintain the same on the target, a speedometer driven by said motor graduated in terms of the reciprocal of the altitude, and means for controlling the motor speed to cause the speedometer to show the known altitude of the aircraft.

3. A bomb sight as claimed in claim 2, wherein the scale of said speedometer is adjustable in accordance with bomb characteristics, whereby the altitude setting is altered for different types of bombs.

4. In a bomb sight, means providing an angularly movable line of sight, a three part integrating device for deriving the range angle or total range as a fixed quantity, means for driving one of said parts at a speed inversely proportional to the time of fall of the bomb $$\left(\frac{1}{T}\right)$$

and means for setting a second part driven by said first part so that the third part driven by said second part keeps the line of sight on the target, whereby the speed of the third part is a function of GS $$\left(\frac{H}{H'}\right)$$

whereby the set position of the second part represents whole range.

5. A trail computing device for bomb sights, comprising a cylinder having axially spaced curves laid out thereon marked in air speed (AS), a circular scale on said cylinder graduated in bomb characteristics, a setting knob rotating said scale to the proper bomb characteristic setting, an index adjustable axially along said cylinder, and means for axially adjusting said index to intersect the proper air speed curve, whereby the axial position thereof represents the trail angle when the cylinder has been rotated to the proper bomb characteristic reading and said index intersects the proper air speed curve.

6. In a bomb sight for aircraft, a variable speed drive for maintaining the line of sight on the target, including a primary driving member, a driven member for turning the line of sight, and an intermediate adjustable member which drives the driven member from the primary driving member, means for varying the speed of the driving member inversely proportional to the time of fall of the bomb, and manual means for adjusting the position of said intermediate member to actuate the driven member at a speed to maintain the line of sight on the target.

7. A bomb sight as claimed in claim 6, wherein the position of the intermediate member determines the range angle or whole range.

8. In a bomb sight, means for determining whole range ($R_{wa}$) with respect to the altitude ratio $$\left(\frac{H}{H'}\right)$$

which is employed as the present scale of the instrument, means for determining trail (Y) as an angular quantity, means for determining the offset angle, and means for combining said trail angle directly with said whole range ($R_{wa}$) to give true range angle and for simultaneously introducing said trail angle into said offset determining means.

9. In a bomb sight for aircraft, means for rotating the line of sight to keep the same on a target, including a member rotatable about a center for rotating the line of sight, a rectilinearly movable member for rotating said rotatable member, whereby the rate of movement thereof equals ground speed (GS) with respect to the altitude ratio $$\left(\frac{H}{H'}\right)$$

or instantaneous scale of the machine, a variable speed gear for moving said rectilinearly movable member, said gear including a disc driven at a speed proportional to a function of the time of fall of the bomb, and a roller carriage radially positioned thereon to keep the sight on the target, whereby the radial position of said roller carriage on said disc is proportional to the whole range ($R_{wa}$) with respect to said instantaneous scale of the machine.

10. In a bomb sight, a variable speed device for turning the line of sight to maintain the same on the target, including a variable speed motor, a variable speed drive actuated thereby for turning the sight, a speedometer driven by said motor, means for governing the speed of said motor to maintain the speedometer indications at a value bearing a predetermined relationship to altitude, and independent means for adjusting said variable speed drive to keep the sight on the target.

11. A bomb sight for aircraft, as claimed in claim 10, in which said speedometer is graduated in inverse altitude and is also adjustable according to the bomb characteristics.

12. A trail computing device for bomb sights, comprising a cylinder having axially spaced curves laid out thereon marked in air speed (AS), a circular scale on said cylinder graduated in bomb characteristics, a setting knob rotating said scale to the proper bomb characteristic setting, an index adjustable axially along said cylinder, means for axially adjusting said index to intersect the proper air speed curve, whereby the axial position thereof represents the trail angle when the cylinder has been rotated to the proper bomb characteristic reading and said index intersects the proper air speed curve, and an offset mechanism for said sight means for introducing the trail angle so obtained directly into said offset mechanism.

EARL W. CHAFEE.
HOWARD C. VAN AUKEN.